Patented Dec. 17, 1940

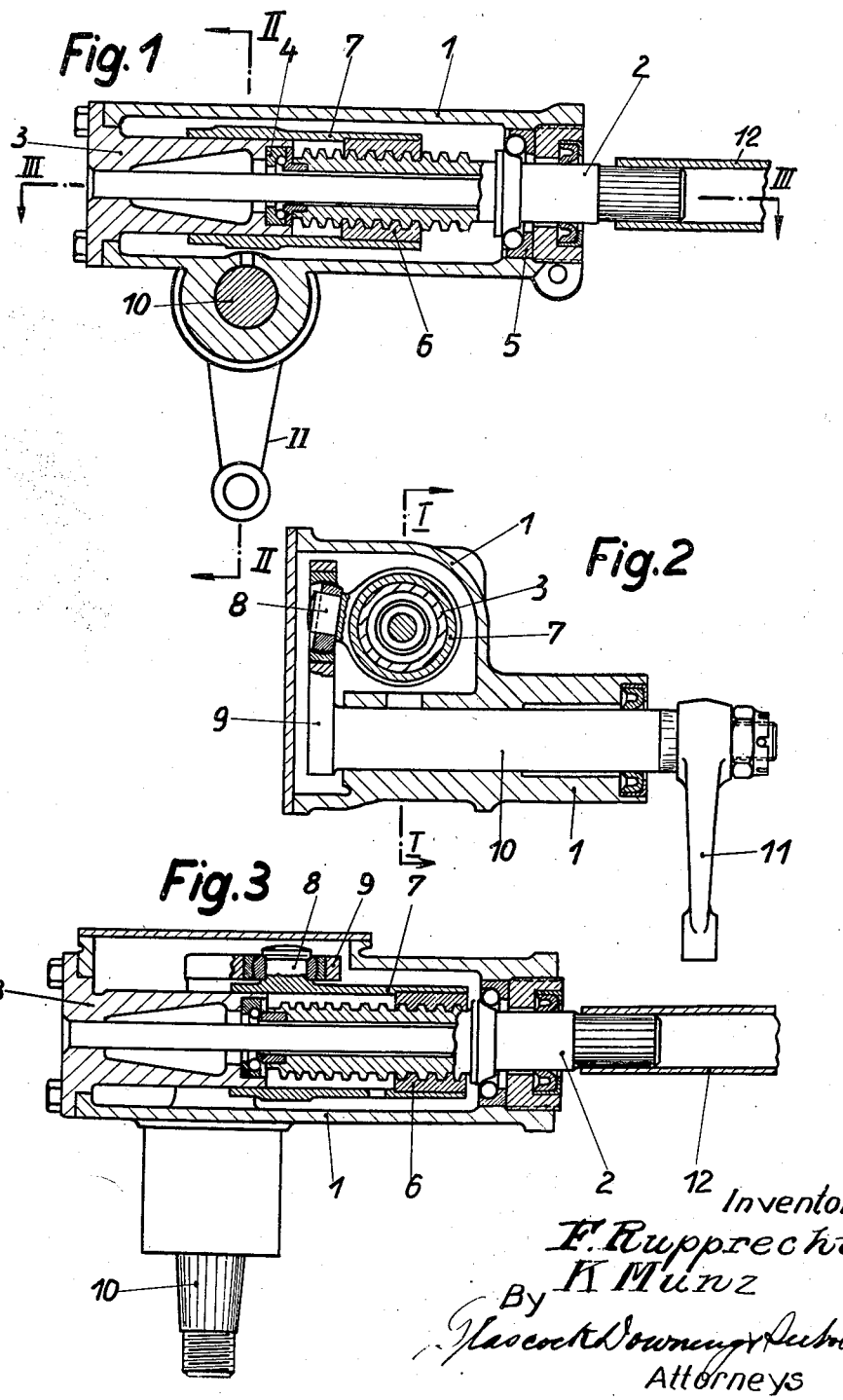

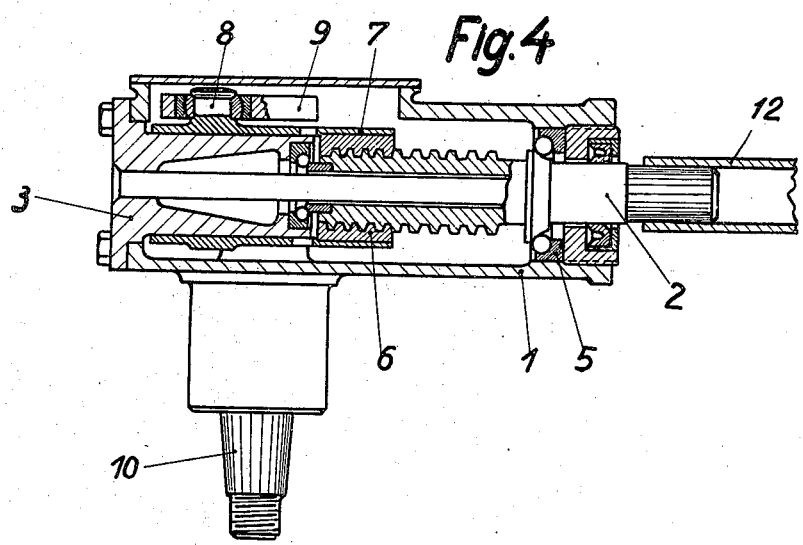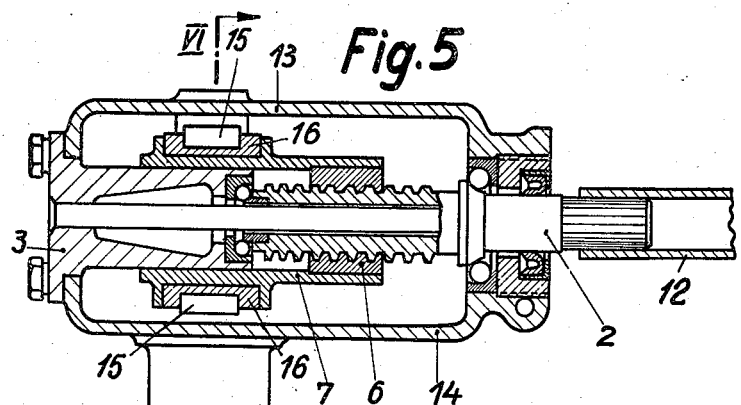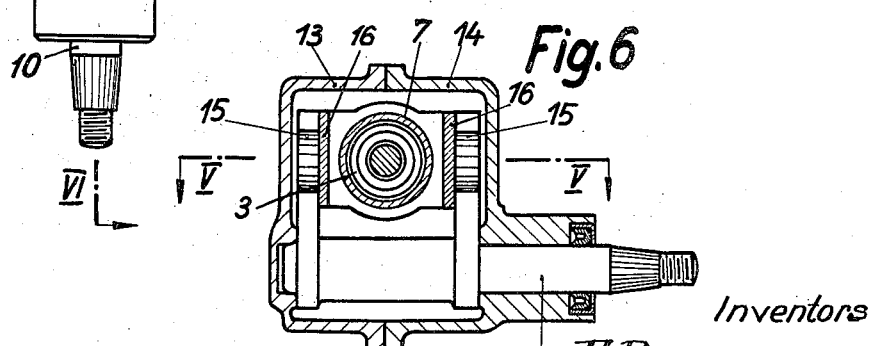

2,225,279

UNITED STATES PATENT OFFICE 2,225,279

STEERING GEAR

Friedrich Rupprecht, Neu-Edingen, near Mannheim, and Karl Münz, Mannheim, Friedrichfeld, Germany Application February 23, 1939, Serial No. 258,096
In Germany March 9, 1938

4 Claims. (Cl. 74—499)

Our invention relates to steering gears, especially for motor vehicles of all kinds.

Steering gears comprising a steering nut and a steering screw are known in which the steering nut is guided in a cylindrical bore in the steering gear box, and is operatively connected to an arm on the shaft of the knuckle arm. The connecting arm may be arranged at one side of the box, or it may be arranged in its central vertical plane, and forked for engaging both sides of the nut. This arrangement either requires slotting of the steering gear box in one, or in both sides, so that the gear box lacks rigidity and is forced asunder by the tilting force acting on the steering nut, resulting in jamming of the nut in the box, and of the threads in the screw and the nut, or, if slotting is avoided by placing the connecting lever at one end of the gear box, the gear becomes very long and expensive in proportion.

It has also been proposed not to guide the nut in the gear box at all but instead to make it so long that the tilting force is absorbed. As mentioned above, considerable length of the gear is not desired, and, moreover, the steering screw must also be made rather long so that it lacks rigidity against the tilting force, resulting in jamming of the threads.

It is an object of our invention to provide a steering gear which is without the aforesaid drawbacks.

To this end, we provide, in combination with a steering gear box, a steering screw mounted to rotate in the gear box, and a steering nut on the screw: means for rotating one of the two threaded members—normally the usual steering column for rotating the steering screw—means, such as a one-sided or forked connecting lever, for transmitting the axial displacement of the other threaded member—normally the nut—to a knuckle arm, and we provide a slide bar in the gear box, and means, such as a sleeve, on the other member, for guiding it on the slide bar during its axial displacement. In a preferred embodiment of our invention, the steering nut which is mounted for axial displacement on the thread of the steering screw, is a hollow member supporting the female thread at one end, and mounted to slide on the slide bar in the gear box with its other end.

It is another feature of our invention that the steering screw is mounted to rotate at one end in the slide bar which is rigidly connected to the gear box and guides the hollow nut member, and the other end of the screw is mounted to rotate in the gear box.

A particularly favorable arrangement of our invention is that in which the hollow member sliding on the slide bar is a cylindrical sleeve in which a femalely threaded annulus is inserted.

In the accompanying drawings, a steering gear with a one-sided connecting lever, and a steering gear with a forked connecting lever, embodying our invention, are illustrated by way of example.

In the drawings:

Figs. 1 to 4 illustrate the first-mentioned gear, and Figs. 5 and 6 illustrate the second-mentioned one.

Fig. 1 is a section of the gear on the line I—I in Fig. 2,

Fig. 2 is a section on the line II—II in Fig. 1.

Figs. 3 and 4 are sections on the line III—III in Fig. 1, showing the nut in its upper and lower final position, respectively.

Fig. 5 is a section on the line V—V in Fig. 6.

Fig. 6 is a section on the line VI—VI in Fig. 5.

Referring now to the drawings, the steering column 12 and the steering screw 2 are shown in horizontal position for the sake of convenience.

Referring to Figs. 1 to 4, the upper portion of the steering screw 2 is mounted to rotate in a ball bearing 5 at the upper end of the steering gear box 1 and the tubular steering column 12 is arranged on the serrated upper end of the screw 2. The thread of the screw 2 is arranged between the upper ball bearing 5 and a lower thrust ball bearing 4. A hollow slide bar 3 is secured to the lower end of the box 1 with its lower end. The slide bar projects into the box 1, defining an annular space with its inner wall, and supporting the ball bearing 4 at its upper, or inner, end. An annulus 6, with a female thread engaging in the male thread of the screw 2, is inserted in the upper end of a sleeve 7 whose lower end slides on the bar 3.

A radial trunnion 8, Figs. 2 to 4, projects from one side of the sleeve 7 and its free end engages, through a ball-and-socket joint, in the free end of a connecting lever 9. This lever is on the inner end of a shaft 10 rotating in a bearing forming part of the box 1, and its outer, tapered and serrated end supports the boss of the knuckle arm 11.

The annulus 6 and the sleeve 7—which might be made integral with each other if desired—constitute the hollow member referred to in the introduction. As also described in the introduction, the screw 2 is mounted to rotate at its lower end in the ball bearing 4 in the slide bar 3 and its upper end is mounted to rotate at 5 in the gear box 1.

The sleeve portion 7 of the hollow member may have any desired cross-section, but it is preferred that it should be a hollow cylinder, as illustrated and also mentioned in the introduction.

The operation of the gear which has been just described, will best be understood from Figs. 3 and 4. By rotating the steering column 12 in a given direction, the annular member 6 and the sleeve 7 are moved to an upper final position, as shown in Fig. 3. It will appear that in this final position the lower end of the sleeve 7 is still supported by the slide bar 3. When the steering column 12 is rotated in the opposite direction, the sleeve 7 is moved into its lower final position, Fig. 4.

It will appear that in both final positions—and obviously in all intermediate positions—the sleeve 7 is supported at both ends so that its full length, which is considerable, is available against the tilting forces acting on the hollow member through the trunnion 8, so that tilting and jamming are prevented. In the two final positions of the hollow member where the tilting force is a maximum, the annulus 6 is in the immediate vicinity of one of the ball bearings 4 and 5 and deflection of the screw 2 is thus prevented.

In the arrangement described with reference to Figs. 1 to 4, the hollow member formed of the annular member 6 and the sleeve 7 performs a partial rotation about the axis of the screw 2 because the upper end of the connecting lever 9 moves on a circular arc.

Referring now to Figs. 5 and 6, this gear mechanism has a divided gear box comprising two halves 13 and 14, with a flange at the center of the box for connecting its halves, Fig. 6. Each half has a bearing for the shaft 10 of the knuckle arm 11. The connecting lever is fork-shaped, with a pair of arms 15 arranged at opposite sides of, and equidistant from, the axis of the screw 2. The free end of each arm 15 engages in a U-shaped wearing plate 16, the sleeve 7 of the hollow member forming a sort of crosshead.

Otherwise, the construction and operation of the gear illustrated in Figs. 5 and 6 is similar to that illustrated in Figs. 1 to 4, but the sleeve 7 undergoes no partial rotation by the arms 15 of the forked connecting lever.

We claim:

1. In a steering gear, a steering gear box, a steering screw, a bearing for one end of the steering screw in the box, a steering nut in the shape of a hollow member having a female thread engaging in the steering screw at one end, a slide bar in the box for the other end of the hollow member to slide on, a bearing for the other end of the steering screw on the slide bar, means for rotating the steering screw, and means for transmitting the axial displacement of the hollow member to a knuckle arm, and for holding the hollow member against rotation about its axis.

2. In a steering gear, a steering gear box, a steering screw mounted to rotate in the box, a steering nut in the shape of a cylindrical hollow member having a female thread engaging in the steering screw at one end, a cylindrical slide bar projecting in the box opposite to and in axial alignment with said steering screw, said cylindrical member engaging said slide bar and sliding thereupon with its other end, means for rotating the steering screw and means for transmitting the axial displacement of the hollow member to a knuckle arm and for holding the hollow member against rotation about its axis.

3. In a steering gear, a steering gear box, a steering screw mounted to rotate in the box, a bearing for one end of the steering screw, a steering nut in the form of a cylindrical hollow member having a female thread engaging the steering screw at one end, a cylindrical slide bar projecting in the box opposite to and in axial alignment with said steering screw, a bearing on the slide bar for the other end of the steering screw, said cylindrical hollow member engaging said slide bar and sliding thereupon with its other end, means for rotating the steering screw, and means for transmitting axial displacement of the hollow member to a knuckle arm and for holding the hollow member against rotation about its axis.

4. In a steering gear as claimed in claim 3, wherein the steering nut comprises a cylindrical sleeve and an annular member therein carrying the female thread engaging the steering screw.

FRIEDRICH RUPPRECHT.
KARL MÜNZ.